US006940513B2

(12) United States Patent
Morgan III et al.

(10) Patent No.: US 6,940,513 B2
(45) Date of Patent: Sep. 6, 2005

(54) DATA AWARE CLUSTERED ARCHITECTURE FOR AN IMAGE GENERATOR

(75) Inventors: David L. Morgan III, Redwood City, CA (US); Ignacio Sanz-Pastor, San Francisco, CA (US)

(73) Assignee: Aechelon Technology, Inc., San Carlos, CA (US)

( * ) Notice: Subject to any disclaimer, the term of this patent is extended or adjusted under 35 U.S.C. 154(b) by 0 days.

(21) Appl. No.: 10/795,725

(22) Filed: Mar. 5, 2004

(65) Prior Publication Data

US 2004/0169657 A1 Sep. 2, 2004

Related U.S. Application Data

(63) Continuation of application No. 10/102,421, filed on Mar. 19, 2002, now Pat. No. 6,714,203.

(51) Int. Cl.[7] ............................................. G06T 1/20
(52) U.S. Cl. ....................................... 345/506; 345/520
(58) Field of Search ................................. 345/506, 502, 345/501, 530, 520, 581, 557, 418, 419, 423, 424; 707/100, 102, 103 R, 10, 104.1, 103 Y

(56) References Cited

U.S. PATENT DOCUMENTS

| | | | |
|---|---|---|---|
| 5,101,493 A | 3/1992 | Travis et al. | |
| 5,369,502 A | 11/1994 | Fukuda et al. | |
| 5,819,283 A | 10/1998 | Turkowski | |
| 5,987,458 A | 11/1999 | Anderson et al. | |
| 5,991,465 A | 11/1999 | Anderson et al. | |
| 5,995,996 A | 11/1999 | Venable | |
| 6,023,704 A | 2/2000 | Gerard et al. | |
| 6,046,744 A | 4/2000 | Hoppe | |
| 6,075,540 A | 6/2000 | Hoppe | |
| 6,154,215 A * | 11/2000 | Hopcroft et al. | 345/418 |
| 6,292,200 B1 * | 9/2001 | Bowen et al. | 345/506 |
| 6,393,495 B1 | 5/2002 | Flory et al. | |
| 6,539,116 B2 | 3/2003 | Takaoka | |
| 6,753,878 B1 * | 6/2004 | Heirich et al. | 345/629 |
| 2002/0030675 A1 * | 3/2002 | Kawai | 345/204 |

OTHER PUBLICATIONS

Morris Goldberg, et al., *Comparative Performance of Pyramid Data Structures for Progressive Image Transmission*, IEEE Transactions on Communications, vol. 39, No. 4, Apr. 1991, pp. 540–548.

Whoi–Yui Kim, et al., *Hierarchy Embedded Differential Image for Progressive Transmission Using Lossless Compression*, IEEE Transactions on Circuits and Systems for Video Technology, vol. 5, No. 1, Feb. 1995, pp. 1–13.

International Search Report for PCT/US03/08798.

* cited by examiner

*Primary Examiner*—Kee M. Tung
(74) *Attorney, Agent, or Firm*—Fenwick & West LLP

(57) ABSTRACT

A data aware clustered system architecture is described for an image generation system. The architecture leverages commodity personal computers to provide the processing capability of the image generator such as may be used in a flight simulator. The architecture supports a data pipeline for processing stages of a progressive data structure for the transformation of data from abstract data to a more concrete form for the generation of an image. The architecture provides a multi-staged data flow that extends transparently from a single node system to multiple CPUs in a single node system, to multiple nodes in a clustered system or to multiple CPUs on each node of a clustered system.

11 Claims, 10 Drawing Sheets

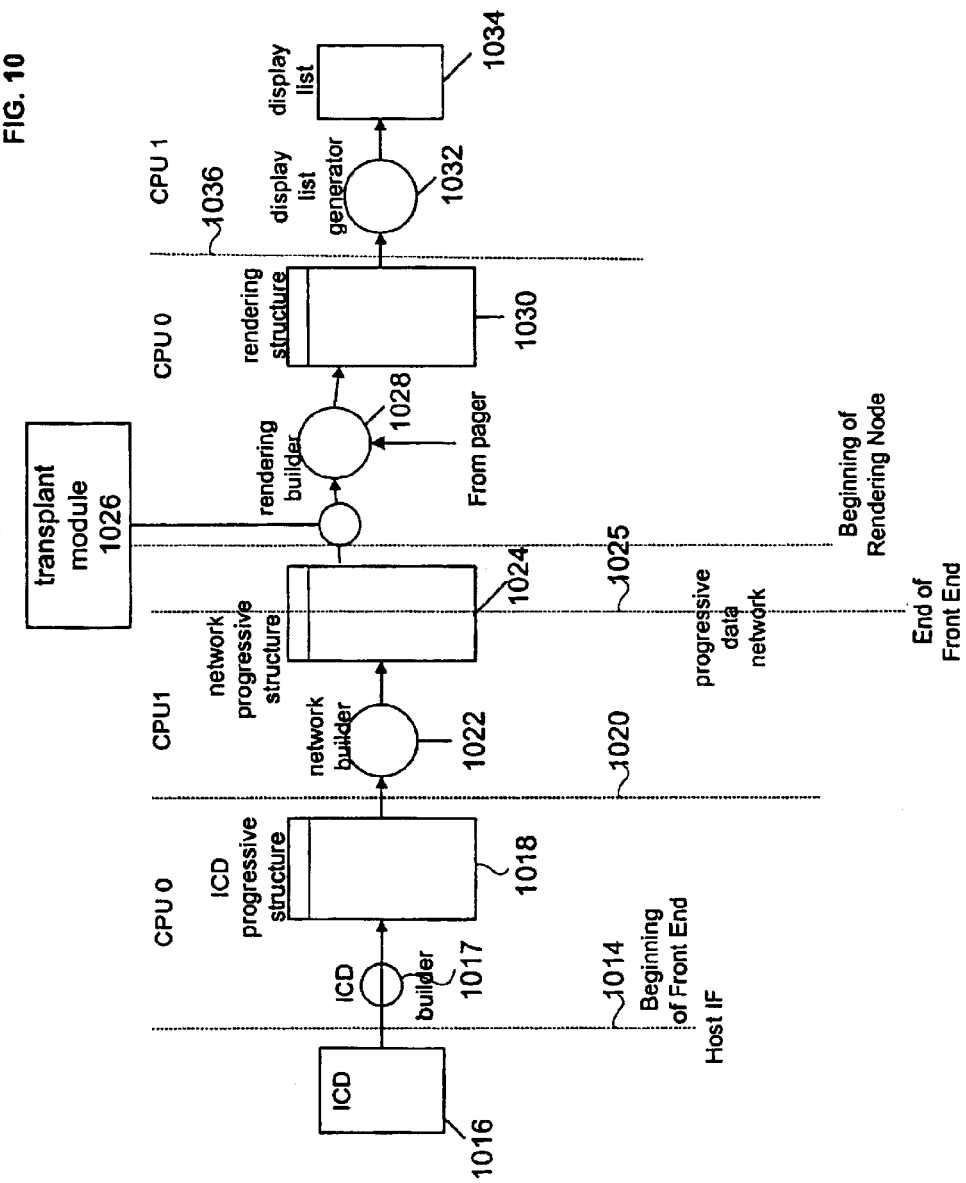

DATA AWARE CLUSTERED ARCHITECTURE FOR AN IMAGE GENERATOR

CROSS REFERENCE TO RELATED APPLICATIONS

This application is a continuation of application Ser. No. 10/102,421, filed on Mar. 19, 2002, now U.S. Pat. No. 6,714,203, which is incorporated herein by reference in its entirety.

BACKGROUND

1. Field of the Invention

This invention relates to the field of computer graphics, specifically, the architecture of real time graphics rendering systems.

2. Description of the Related Art

An image generation system is a computer graphics rendering system, typically rendering images from geometric data in real-time. In many applications, an image generation system is tasked with transforming data into a form that can be rendered by a graphics processor to provide a visually realistic representation of an environment. Many applications are interactive so that the image generation system must respond in real-time to keep the environment synchronized with the current viewpoint of the user to provide the necessary realism. An image generator must render a scene at a rate equal to the display's refresh rate, typically 60 Hz. It is important that the image generator constantly meet this refresh rate target, or the scene will appear to stutter or jitter. Flight simulation is the quintessential example of interactive 3D computer graphics applications. Additionally, flight simulation is no longer limited to the visual spectrum. For military flight simulators, it is important to also simulate sensors, such as FLIR (Forward Looking Infra Red), NVG (Night Vision Goggles), and Radar. In a geospecific simulator, multispectral or hyperspectral (i.e. some or many wavelengths) imagery may be used in conjunction with an accurate model of the sensor's spectral response characteristics to create a physics-based simulation of how a particular sensor will behave during a simulated mission. Other examples of interactive 3D computer graphics applications include high-end video games, virtual reality games, modeling systems, scientific visualization systems, and training systems for performing spacecraft maneuvers or operating transportation craft such as tankers and trucks. These applications also include a geometrical description of the simulated environment, including models and textures for the actual terrain, cultural features such as buildings, trees and roads, and special effects such as explosions and smoke columns, forming what is usually called the scene database or, more commonly, simply the 'database' for a given simulated area. Terrain is the largest element of a large geospecific database. The texture and elevation data can range in size from a few gigabytes to over a terabyte for a single database.

The image generation systems for these applications include or has an interface to a simulation host computer system that runs a numerical model that simulates the appropriate dynamics, for example aircraft dynamics. The data received from the host computer is processed by the image generation system for use by one or more channels in the image generator. A channel is a rendering computer system having a graphics system coupled to a display. Examples of displays include a projector and a screen, a monitor, a heads up display in a cockpit, or a multifunction display used to represent non-visual spectrum data, such as the forward looking infrared sensor. A simulated cockpit may have six projectors all providing an immersive display, and each of those projectors is run by a channel.

Although traditionally, the image generator systems have been integrated in a single computer system, the advent of high performance low cost personal computer systems makes the creation of image generation systems out of a collection of commodity personal computers possible.

In these clustered systems, multiple computers perform different tasks that, when combined together, amount to the entire functionality of a full image generation system. The creation of this integrated clustered system formed of multiple computers presents one problem of integration and communication of the nodes in the system so that they appear to be a single, unified system for external systems such as the host computer in the flight simulator example.

Typically approaches using a data protocol between the external system and the image generation systems are used across nodes, meaning that each node in the cluster perceives itself as an entire image generator with a single display output, but these approaches result in costly replication of the scene database across nodes and difficult management of the image generator as a whole.

A similar problem arises with the use of multi-processor systems. Sharing the work and data across multiple central processing units (CPUs) is frequently a requirement for high performance, but splitting the work in multiple threads proves to be difficult to implement and make scalable, especially while guaranteeing consistent real-time performance.

Systems such as Silicon Graphics Inc. (SGI's) IRIS Performer provide a simple and elegant infrastructure to share work across CPUs in a single system, but they do not readily extend into clustered distributed systems. Other clustering architectures for use in the context of scientific computing require lower level changes to the software at nodes across the system. In addition, the focus is on the actual distribution of the computational workload rather than the data used in the computations. Computational cluster architectures also rely upon low-latency network interconnects such as Myrinet which are much more costly than off-the-shelf network interconnects such as gigabit Ethernet.

SUMMARY OF THE INVENTION

In one aspect, the present invention provides a data pipeline for processing multiple stages or versions of a progressive data structure in an image generation system. In one embodiment, this progressive data structure includes a header section with a table of pointers to a collection of data substructures. The structure of a progressive data structure follows the same pattern in every stage. In each stage of the pipeline, the progressive data structure has pointers to substructures comprising data for the attributes of one or more components associated with a scene, and those pointers contain the address in the progressive data section for that particular substructure if present, or NULL if not present. These data substructures may include nested data substructures. The data structure is progressive because its contents are developed as it progresses through the pipelined building process. As data incoming to the pipeline progresses through the different stages, the nature of the data in the versions of progressive data structures transforms from abstract information to a concrete or expanded form suitable for graphics rendering operations. An early stage progressive data structure may be only a few hundred bytes in size, and have abstract data, for example weather status or target types in the flight simulator example, but by the time the data is rendered or used for actual final computations, the size can be hundreds of megabytes, and include coordinates, texture maps and rendering parameters.

Builder functions or modules perform processing based on a progressive data structure. A builder may organize or format incoming data into the progressive data structure format. A builder may traverse this structure and expand the data in the substructures by performing rendering computations. A builder may also traverse the structure and remove substructures not to be processed for a particular function such as objects outside the view frustrum of a channel. An example of expansion is computing the colors of the sky, clouds, and terrain, from a single time of day parameter. An example of contraction is deleting all parameters relating to a component such as a ground target (e.g., a truck) if that ground target is disabled or beyond the horizon and pointing to NULL any pointer in a parent of a substructure that contains any of these parameters. Builder functions may be implemented in software stored in a computer usable medium such as a memory, a compact disc, or computer disk, or be carried in a data transmission medium such as a signal. The progressive data structure may also be stored in a computer usable medium or be carried in a data transmission medium.

This pipeline infrastructure enables a multi-stage data flow that can extend transparently from a standalone system to a single node system with multiple processors, to a clustered system with multiple nodes or a clustered system having one or more nodes with multiple processors.

The present invention may also be embodied in a clustered system having a plurality of multiple processor nodes for performing the processing of the multi-stage progressive data pipeline for image generation. The plurality of nodes includes two main types of nodes, a front-end node and a back-end node. In one aspect, a system having a clustered architecture typically interfaces as an integrated unit with other systems or user interfaces. In one embodiment, the front-end node has a data communications interface for the image generation system. Furthermore, the front-end node transforms incoming data into a progressive structure format and removes unnecessary structures that are not to be rendered for a frame based on the current viewpoint or mode settings. Examples of mode settings include a setting indicating whether or not terrain rendering is enabled or a setting indicating whether or not special effects are enabled.

The front-end node is networked with the back-end nodes for the transmission of progressive data structures. In one embodiment of the clustered system, a multicasting network protocol is used for sending the data to the nodes, which avoids having the front end node issue an independent stream of packets to each node, reducing aggregate bandwidth requirements and increasing system performance. The front node and the back-end nodes are also networked via a system network. The nodes in the clustered system architecture communicate data, particularly administrative data, examples of which are control, status, statistics data, between themselves, particularly between the front-end node and each back-end node, using the system network.

Back-end nodes receive the progressive data structure generated by the front-end node, and perform different processing based upon the functions performed by the node. Examples of back-end nodes include rendering nodes that perform computations the results of which are in a suitable form for display by a display system.

Another type of back-end node is a data retrieval node that updates the data in the locally stored scene description database of the rendering nodes. For example, in the flight simulator example, the image generation system includes database retrieval nodes which retrieve the texture data representing the terrain the pilot would see at a certain altitude and location, in accordance to the current position of the airplane and viewpoint. For this example, the database retrieval nodes then transmit the texture data over a third network to rendering nodes, which apply the texture data to the terrain, and then use the viewpoint received from the front end to project the scene onto the display. By having nodes with scene database storage retrieve the data needed by other nodes performing rendering and other graphics related computations or functions, these other nodes are not involved in managing multiple copies of the database, which must be fastidiously maintained to be of the same revision, and avoid having to retrieve data from disk and manage the potential performance impact of the disk operations. Additionally, it is advantageous to keep one copy of the scene database because the added cost of storage devices, the increased likelihood of failure due to the failure of a storage device, and the increased time required to load a new scene database into the image generator are all abated.

BRIEF DESCRIPTION OF THE DRAWINGS

FIG. 10 illustrates an example of dataflow in the system of FIG. 9 in accordance with the present invention.

DETAILED DESCRIPTION OF THE PREFERRED EMBODIMENTS

It is understood by those of skill in the art that the various embodiments of the systems and methods of the invention may be embodied in hardware, software, firmware or any combination of these. Additionally, those skilled in the art will appreciate that although modules or functions may be depicted as individual units, the functionality of the modules may be implemented in a single unit or in any combination of units.

Figure 1:
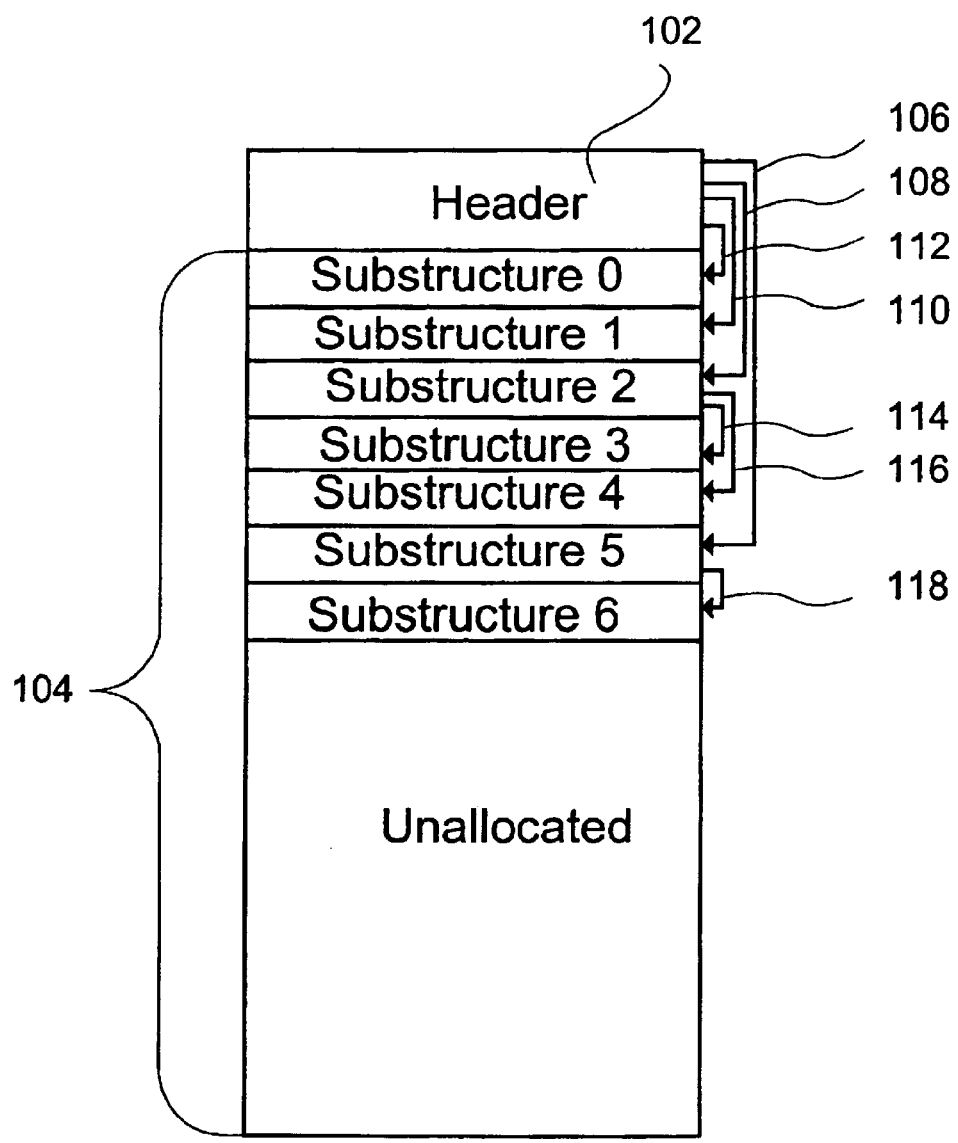
FIG. 1 illustrates an embodiment of a progressive data structure in accordance with the present invention.

FIG. 1 illustrates an embodiment of a progressive data structure in accordance with the present invention. In this embodiment, the progressive data structure is allocated in a single contiguous block of memory. The header section 102 comprises a table of pointers to a collection of substructures located in a data portion 104. Substructures 0, 1, 2 and 5, which will be referred to as top-level or base substructures, each have a corresponding pointer in the header section represented by the arrows 106, 108, 110, 112 from the header section to each substructure. There is a pointer to every base or top-level substructure having the potential to be active in a scene, and the pointer contains the address in the progressive data section for a particular substructure if active, or NULL if not active. A substructure is not active if the component for which it has data is not present, for example not to be displayed in a frame in one version of the progressive structure or not to be displayed in the view frustrum for a particular channel in another version. A substructure is also not active or inactive it if will not be processed for a particular function, for example for inter-section analysis. It will be understood by those of skill in the art that NULL is a special value and that another special value may also be used to indicate that a substructure is not active.

Some of the base substructures also point to nested substructures by pointers also represented by arrows 114, 116, 118. Substructure 2 contains pointers which point to (114, 116) substructures 3 and 4. Substructure 5 contains pointers which point to (118) substructure 6. Likewise NULL within the parent of a nested data substructure indicates that the nested substructure is not active.

The processing of the progressive data structures may be performed by a standalone system having one or more processors, a network of nodes, each node having one or more processors, or a clustered system with multiple nodes, each node having one or more processors. In one embodiment, each progressive data structure has a frame and timestamp identifier associated with it allowing the builder module and other function modules in a stage to execute in different processors or different pipeline time slices. For any of these image generation system embodiments, the data flow is the same, but the pipelined data structure can leverage the existence of additional nodes or processors transparently for the application. If the stages of the progressive data pipeline are implemented in a standalone system, all the progressive data structures are built in local memory, and the network transport is not needed between different stages.

Figure 2:
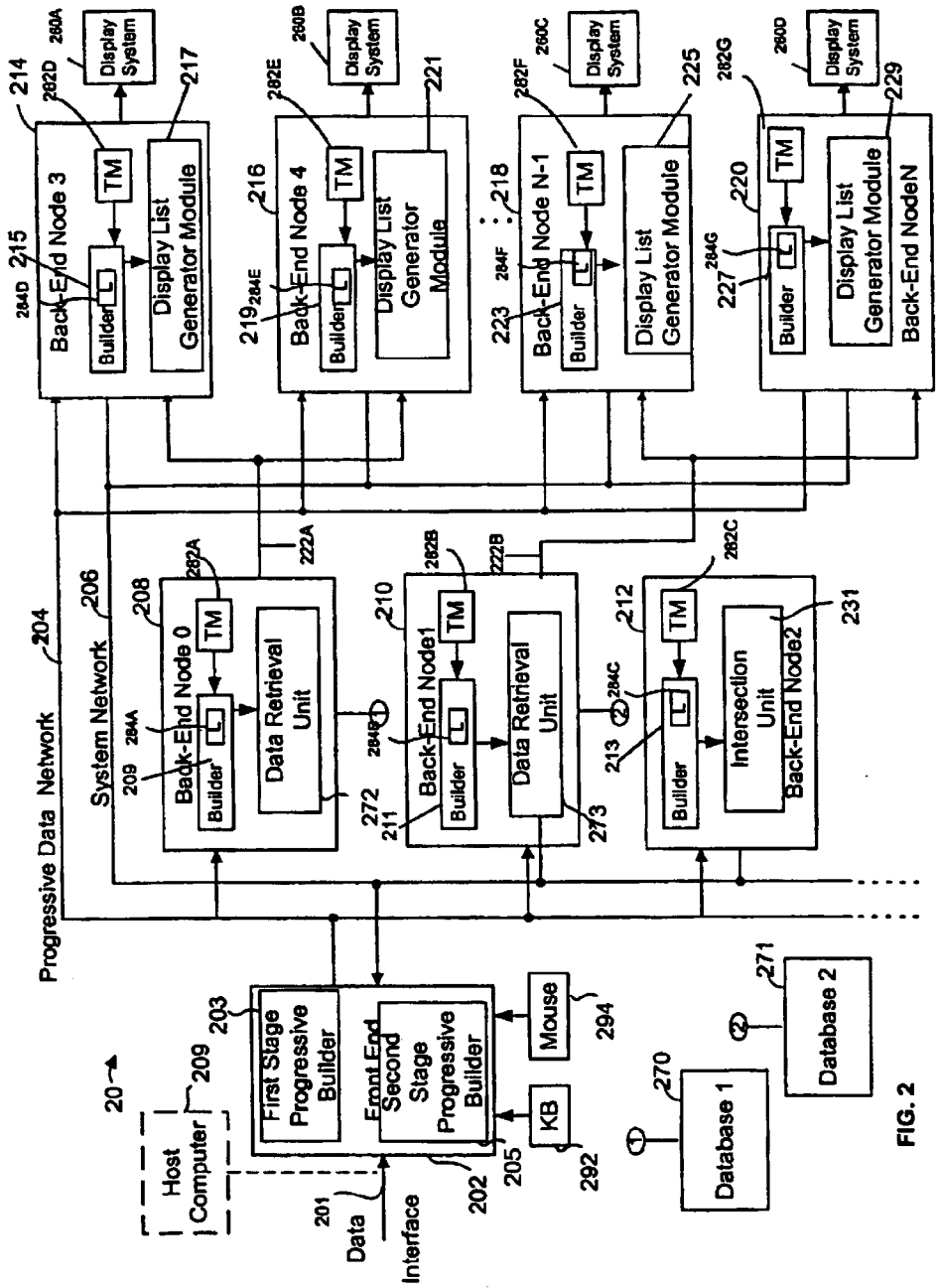
FIG. 2 illustrates an embodiment of a clustered system architecture for an image generation system in accordance with the present invention.

FIG. 2 illustrates an embodiment of a clustered system architecture 20 for an image generation system that takes advantage of the transparency of the progressive data structure pipeline in accordance with the present invention. The system architecture of FIG. 2 provides for a bi-directional network topology linking the nodes. The system architecture comprises a front-end node 202 and several back-end nodes 208, 210, 212, 214, 216, 218, 220 that are linked via networks. One network is a progressive data network 204. The progressive data network 204 is a data protocol network in the sense that each of the nodes transmits or receives data organized as a progressive data structure. Through the progressive data network 204, the front-end 202 transmits data regularly, for example every frame, to all the back-end nodes in the image generation system. Another network is the system network 206. The nodes in the system architecture 20 communicate data, for example administrative data such as control, status and statistics data, between themselves, particularly between the front-end node and each back-end node, using the system network 206. A third network is between one type of back-end node, a data retrieval node 208, 210 and another back-end node to which it sends the retrieved data, for example rendering nodes 214, 216, 218, 220. Each data retrieval node 208, 210 is associated with an appropriate database 270, 271 in which the scene data for an associated type of data is organized. Some display channels are associated with visual data, but others may be associated with non-visual data requiring different database processing and/or organization. Each data retrieval node 208, 210 sends the retrieved data in network packets to the rendering nodes designated as being members of a specific multicasting group via a third network 222A or 222B. This network path provides asynchronous database access, which is advantageous because it insulates the rendering nodes from varying disk access times which can make maintaining consistent real-time performance difficult.

Those of skill in the art will understand that the physical implementation of the networks may take various forms. For example, the networks may use separate physical interconnects or be combined into a single, full-duplex interconnect. The networks may be implemented in 100baseT, gigabit Ethernet, a reflective shared memory set-up, or any other physical network interconnect with adequate bandwidth.

An example of a communications protocol for use in one or more of the networks is the User Datagram Protocol (UDP), which is a fast but not guaranteed network transport protocol (as opposed to TCP, the Transfer Control Protocol, which is more common in the Internet and is slower but offers guaranteed delivery). UDP also supports a multicast transfer protocol mode, in which a single node, such as the front-end node 202, can send the same data to a multitude of receiving nodes, such as one or more of the back-end nodes, that have joined a given multicast group, eliminating the need to send the data to each node sequentially. Because of the unreliable nature of the UDP protocol, the progressive data networking infrastructure supports requests for synchronization and resending data if required. Broadcast network protocols, whereby the data is sent to every node in the network without the need to join multicast groups may also be used but may have performance drawbacks if used for database retrieval networks 222A, 222B, because of the effects of different types of nodes not being able to efficiently share a network switch without wasting bandwidth. Extrapolation and filtering functions can be applied to some of the progressive data values to be able to recover from dropped or late progressive data structures and to synchronize the different timers of each node (such as video refresh clocks), ensuring smooth frame transitions in the display (e.g. smooth flight dynamics).

Figure 3:
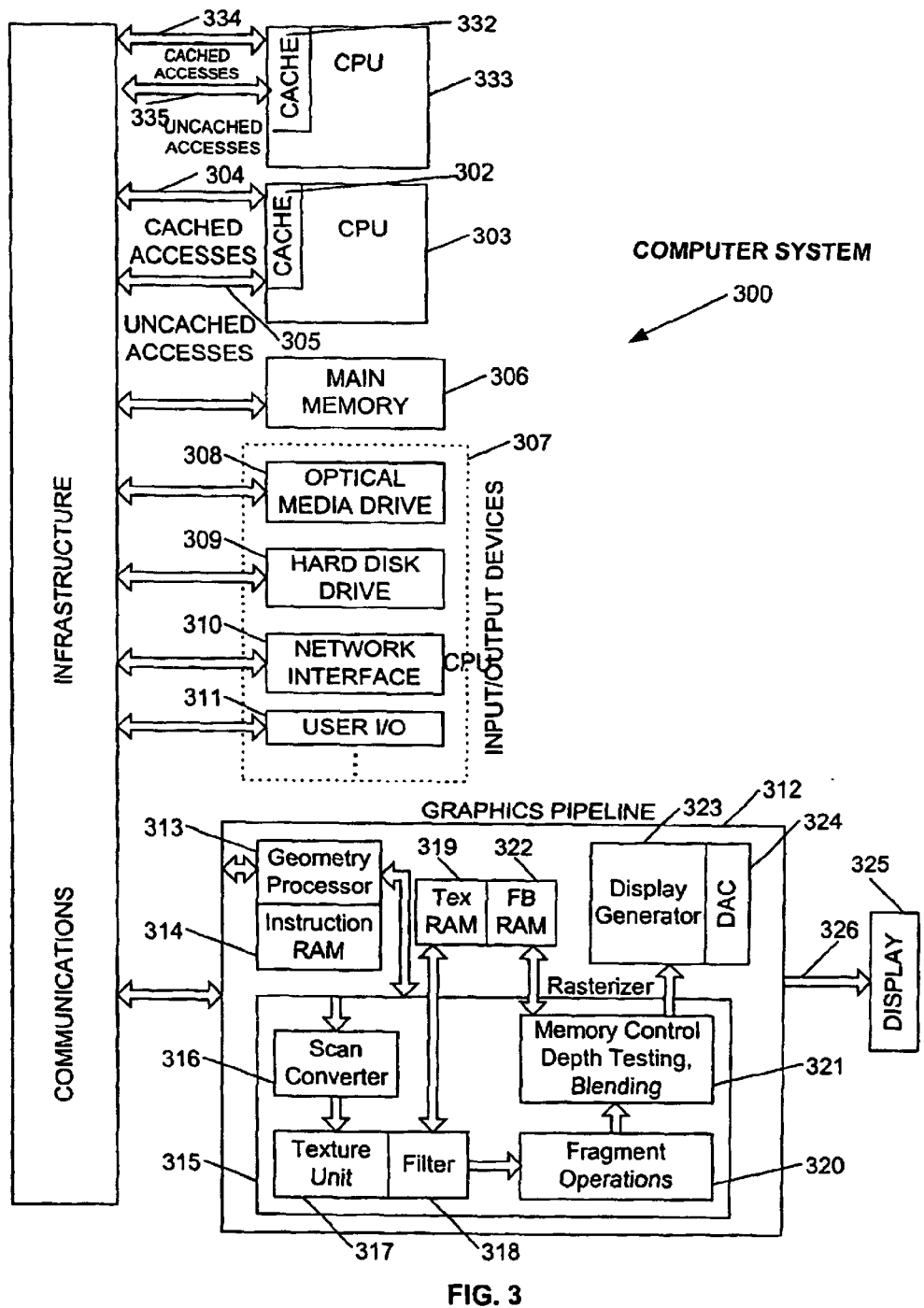
FIG. 3 illustrates an example of a computer system for use in accordance with the present invention.

FIG. 3 depicts an example of a computer system 300 equipped with a three-dimensional graphics pipeline suitable for use with the present invention. The graphics pipeline is one embodiment of a three-dimensional renderer or a real-time three-dimensional renderer. This example computer system is illustrative of the context of the present invention and is not intended to limit the present invention. Computer system 300 is representative of both single and multi-processor computers.

Computer system 300 includes a plurality of programmable processors embodied as central processing units (CPU), 303, 333, and one or more graphics subsystems, such as graphics pipeline 312. One or more CPUs 303, 333 and one or more graphics pipelines 312 can execute software and/or hardware instructions to implement the graphics functionality of an image generator. Graphics pipeline 312 can be implemented, for example, on a single chip, as part of a CPU 303, 333, or on one or more separate chips. Each CPU 303, 333 is connected to a communications infrastructure 301 (e.g., a communications bus, crossbar, or network). Each CPU 303, 333 further comprises a cache memory 302, 332 and both cached 304, 334 and uncached 305, 335 accesses. Computer system 300 also includes a main memory 306, preferably random access memory (RAM), and can also include input/output (I/O) devices 307. I/O devices 307 may include, for example, an optical media (such as DVD) drive 308, a hard disk drive 309, a network interface 310, and a user I/O interface 311. As will be appreciated, optical media drive 308 and hard disk drive 309 include computer usable storage media having stored therein computer software and/or data. Software and data may also be transferred over a network to computer system 300 via network interface 310.

Graphics pipeline subsystem 312 includes frame buffer 322, which stores images to be displayed on display 325. Graphics pipeline 312 also includes a geometry processor 313 with its associated instruction memory 314. In one embodiment, instruction memory 314 is RAM. The graphics pipeline 312 also includes rasterizer 315, which is in electrical communication with geometry processor 313, frame buffer 322, texture memory 319 and display generator 323. Rasterizer 315 includes a scan converter 316, a texture unit 317, which includes texture filter 318, fragment operations unit 320, and a memory control unit (which also performs depth testing and blending) 321. Graphics pipeline 312 also includes display generator 323 and digital to analog converter (DAC) 324, which produces analog video output 326 for a display 325. Digital displays, such as flat panel screens would use digital output, bypassing DAC 324. This example graphics pipeline is illustrative of the context of the present invention and not intended to limit the present invention. An example of a graphics subsystem that may be used is the nVidia Corporation's GeForce™ PC graphics board.

Each rendering or display channel node 214, 216, 218, 220 typically drives a display system 260A, 260B, 260C, 260D such as a projector, flat panel or Cathode Ray Tube (CRT). For example, in a flight simulator, a channel may represent the view out of one of the screens comprising an "out the window" display. Channels may also represent a visual representation of other information or modeling. For example, a channel may render graphics for a particular sensor channel such as Forward-Looking Infra-Red (FLIR), Night Vision Goggles (NVG) or Low Light Level Television (LLLTV). Channels may also drive non-display devices such as video recorders or video digitizers.

The front-end node 202 acts as a communications hub for the image generation system, and also as the communications interface with external systems or user interface devices. Other functions that the front-end may perform include user interfacing, configuration, fault-tolerance management, statistics gathering and display control. An important function that the front-end node 202 performs is transforming incoming data into the progressive data structure that is pipelined to the back-end nodes for further processing.

The front-end node receives through its data interface 201 incoming data relating to the generation of an image, the data including a current viewpoint for a frame. The incoming data may also include data such as attributes for one or more components of a scene. In one example, the incoming data may be formatted in an interface control document (ICD), which is a data structure that contains substructures for each different function in the system. In the flight simulator example, functions include weather effects, moving targets or special effects. In one example, the data may be received from an external host computer 209 and in another example from user input devices native to the front end, such as keyboard 292 and mouse 294.

Figure 4:
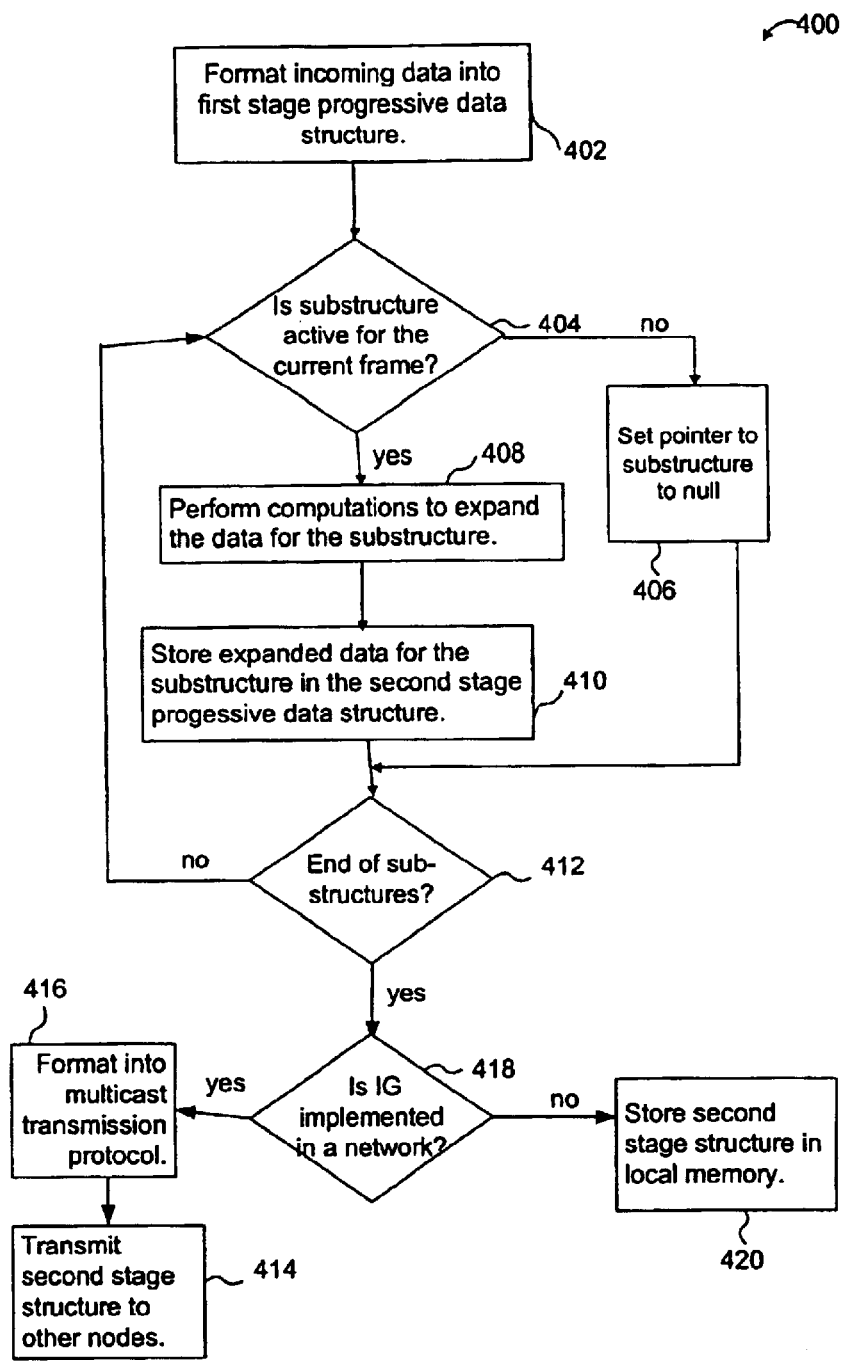
FIG. 4 illustrates an embodiment of a method for building a second stage progressive data structure in accordance with the present invention.

In the embodiment of FIG. 2, the front-end 202 embodies two builder modules for performing the processing for the first two stages of the pipeline. Again, this processing may be performed by other embodiments such as a standalone system. FIG. 4 illustrates an overall method 400 for processing a progressive data structure in the first two stages of a data pipeline. For illustrative purposes, the processing will be discussed in the context of the embodiment of the front-end node 202 of FIG. 2. Also, an example for the processing of data for the display of an aerial flare by an image generator for a flight simulator is considered. Incoming data with information for rendering the current frame is processed by a first stage progressive data structure builder 203 which formats 402 the incoming data into a first stage progressive data structure. In one embodiment, this progressive data structure has pointers to substructures comprising data for the attributes of one or more components associated with a scene, and it is fully populated, meaning no pointer points to NULL. The incoming data for the aerial flare includes attributes such as an enumerated flare type, position (latitude, longitude, altitude in feet) and a trigger signal to activate the flare. The first stage builder stores the data in a progressive data substructure that is contained within the first stage progressive data structure.

A second stage progressive data structure builder 205 (which in the context of a network may also be referred to as the network builder) begins traversal of the first stage progressive data structure beginning with a base substructure. The second stage builder 205 determines 404 if a substructure is active based on factors, for example whether an object for which the substructure has data is outside the current view area of the frame or for which control flags indicate the structure is not to be displayed. If the substructure is not active, it is removed. The pointer to this substructure is set 406 to NULL or another special value. Consequently, any nested substructures associated with the removed substructure are also removed. If on the other hand, the substructure is active for the current frame, computations are performed 408 to expand the data for the substructure. Rendering computations are performed producing resulting rendering data. In this way, the data in the substructure is expanded to a form closer to another form used by the graphics pipeline (e.g. 312) to generate the scene on a display. Rendering computations include computations that produce data useful in rendering an image although this data may not be in the actual or final form used by a rendering system (e.g. 312), or may be in the final form, but is not actually rendered. Examples of the resulting rendering data may include flags, concrete scene data, and scene geometry data.

The expanded data for the substructure is then stored 410 in the second stage progressive data structure. For the aerial flare example, the second stage (network) progressive builder keeps track of the last time the flare was triggered and the flare type that was specified when the last trigger event occurred. The second stage builder uses this retained information accessed from a memory (e.g. cache 302, 332 or main memory 306) to determine whether or not the flare is active. Each enumerated type of flare has an implicit lifetime and color. If the time since the last trigger exceeds the lifetime, the second stage (network) builder omits or removes the flare from the second-stage progressive data structure until it is triggered anew. For the embodiment of the progressive data structure having a header portion having a table of pointers, this omission or removal is performed by placing a NULL pointer instead of the pointer to a flare substructure in its parent substructure in the second-stage progressive data structure. The second stage (network) builder also compares the supplied flare type against the allowed types and considers the flare inactive if the type is invalid. If the flare is determined to be active, the network builder converts the supplied position to the local coordinate system of the image generator (e.g. units in meters relative to the current database origin). The second stage (network) builder also computes the luminance of the flare according to the time elapsed since the flare was triggered. These data, along with data passed unmodified from the first stage progressive structure such as the flare type, are then placed in a progressive data substructure within the second-stage progressive data structure.

After all the substructures have been traversed 412, for a networked image generator such as the clustered system in FIG. 2, the second stage progressive data structure is formatted 416 into a multicast transmission protocol and transmitted 414 to the other nodes of the system, which in FIG. 2 are the back-end nodes. In a standalone configuration, the second stage structure would be stored 420 in local memory for use by other modules in the pipeline.

Processing of the data in the second-stage structure continues in subsequent builders. In the embodiment of FIG. 2, the subsequent processing is performed in the back-end nodes 208, 210, 212, 214, 216, 218, 220. These back-end nodes comprise different types of modules but also some of the same type. Each of these back-end nodes comprises a transplant module 282A, 282B, 282C, 282D, 282E, 282F, 282G. Each back-end node receives the second stage progressive data structure from the front-end over the progressive data network 204. The transplant module reformats the pointers in accordance with its new memory location in a local copy on the back-end node in a process hereafter referred to as 'transplanting.' In one embodiment of transplanting, the node treats all the substructure pointers as memory location offsets, subtracts the original starting address of the front end progressive data structure from each pointer, and adds the new base memory address of the local copy of the received progressive data structure. In a standalone system, transplanting need not be performed. Each of the builder modules in these nodes contains a locator module or unit 284A, 284B, 284C, 284D, 284E, 284F, 284G. A locator is used to find one or more substructures in the second stage structure corresponding to a function, for example, weather effects or a specific scene object, for example, a cloud. In this embodiment, each of these locators accesses the progressive structure, starting with the header in search of the required substructure, and returns the value of the pointer to the substructure.

Figure 5:
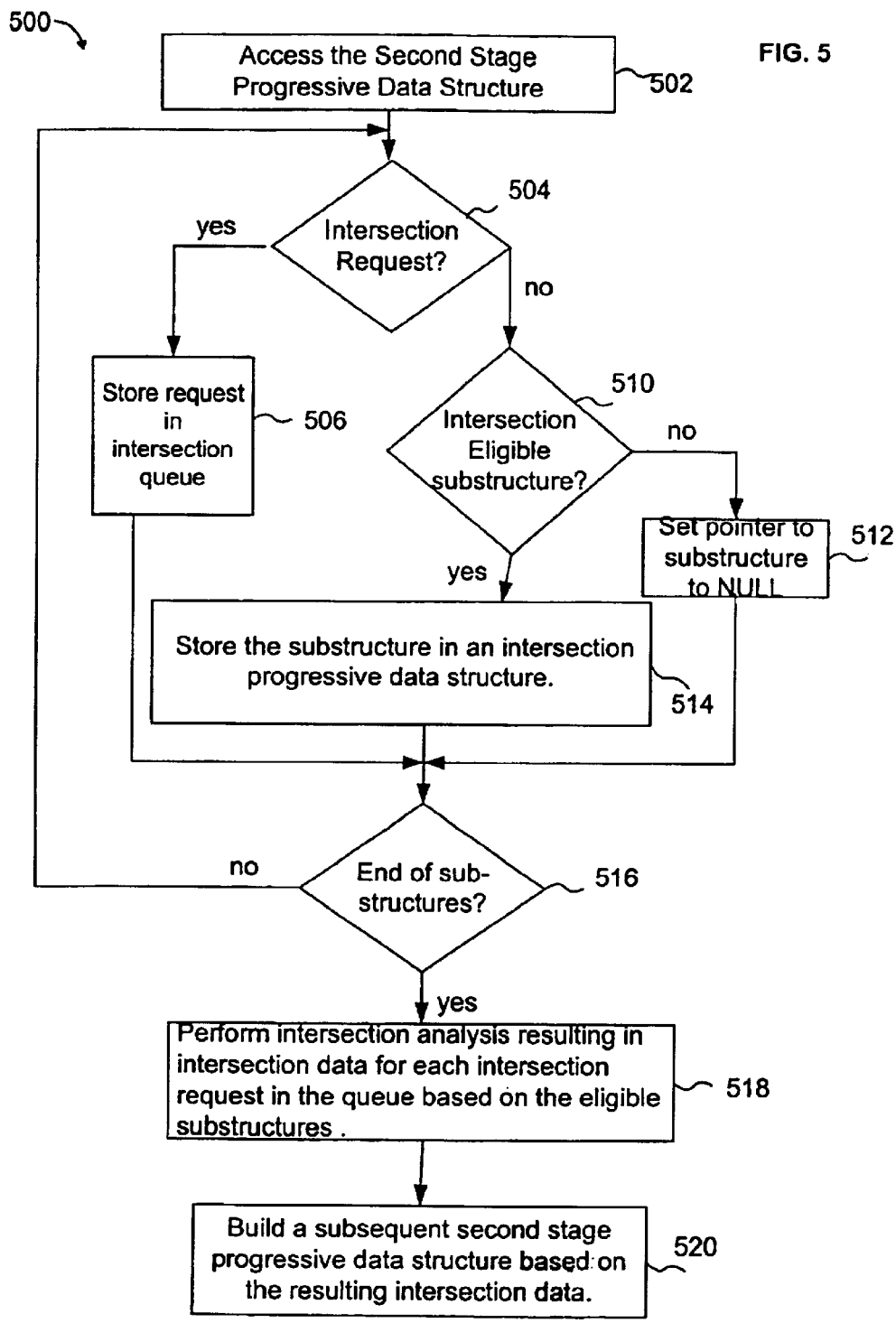
FIG. 5 illustrates an embodiment of a method for processing intersection requests based on information in a progressive data structure for a frame in accordance with the present invention.

In the embodiment of FIG. 2, back-end node 212 has a builder 213 and an example of a function or functional module, an intersection unit or module 231 for processing intersection requests in a progressive data structure. An example of an intersection request in the flight simulator example is a request from the host system to send the height above terrain for a given frame and associated viewpoint location, the actual altitude of the terrain directly under the viewpoint position, or the computation of the distance and intervisibility between two points in the graphics database. For each intersection request, processing comprises performing computations and/or generating intersection data comprising data such as a location and a normal vector for a point where each intersection ray impacts elements of the scene database. Examples of the processing that the intersection unit may perform in the flight simulator example include computing mission functions, such as collisions, height above terrain, inter visibility and terrain following in accordance with the requests. Again, this processing may be performed by other embodiments such as a standalone system. FIG. 5 illustrates an overall method 500 for processing intersection requests in a progressive data structure in accordance with the present invention. For illustrative purposes, the processing will be discussed in the context of the embodiment of the back-end node 212 of FIG. 2.

The builder module 213 accesses 502 a second stage progressive data structure which in this embodiment has been stored in local memory by the transplant module 282C. The locator function 284C within builder 213 accesses the substructures within the second stage structure. If 504 a substructure is an intersection request, the request is identified for processing, for example by storing 506 it in an intersection queue. If 504 the substructure is not an intersection request, the builder 213 determines 510 whether the substructure is eligible for intersections. For instance, in the flight simulator example, some substructures such as clouds are not eligible for intersection requests. Each substructure within the second-stage progressive structure which is eligible for an intersection is stored 514 in the data portion of a third stage progressive structure, an intersection progressive data structure which may be implemented as a modified version of the second stage structure stored in local memory.

The builder 213, referred to in this example as the intersection builder, removes substructures on the basis of their eligibility for an intersection request. For ineligible structures, the parent's pointer within the intersection progressive structure is set 512 to NULL or some other special value that may be assigned. For each intersection request, in the embodiment of FIG. 2, the intersection unit 231 performs intersection analysis for each intersection request based on the substructures in the intersection progressive structure eligible for the request resulting in intersection data for the request. The intersection data is used by the second-stage builder 520 to build a subsequent second stage progressive builder. The intersection data may include a request identification value, the actual origin and endpoint coordinates of the requested intersection vector, a range value and a visibility flag. In the embodiment of FIG. 2, intersection data is transmitted to the front-end via system network 206 whereupon each intersection result may be transmitted to an external host computer or used 520 in the building of subsequent second-stage progressive data structures depending on the nature of the corresponding intersection request. In the context of a standalone configuration, the intersection data is stored in local memory for use by the second stage builder or transmitted to a host computer.

Figure 6:
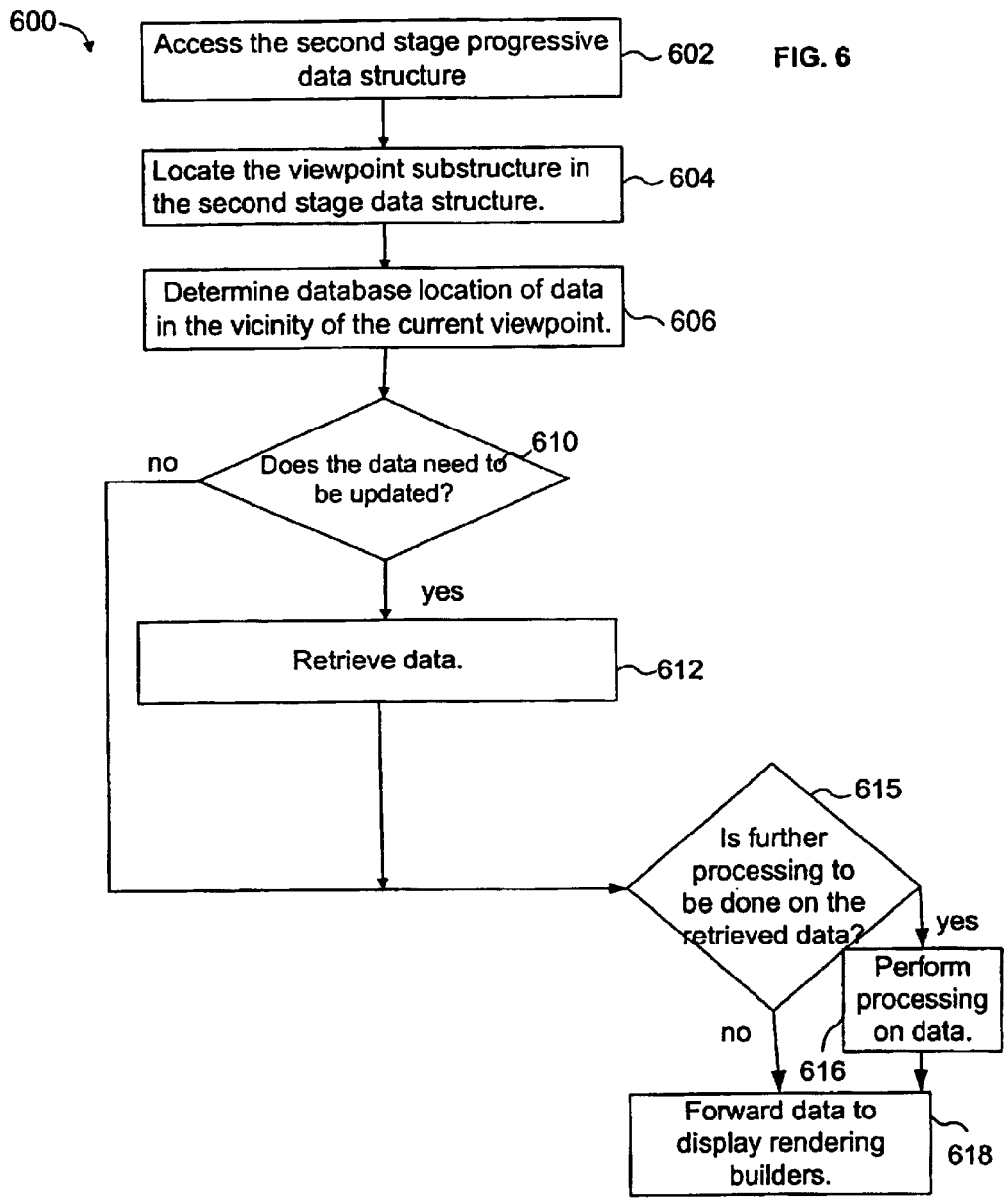
FIG. 6 illustrates an embodiment of a method for retrieving data from a graphics database for a frame based on information in a progressive data structure in accordance with the present invention.

A builder for data retrieval is another builder that performs subsequent processing on the second stage structure. In the embodiment of FIG. 2, the back-end nodes 208, 210 have a builder 209, 211 and another example of a functional module, a data retrieval unit or module 272, 273. Again, this processing may be performed by other embodiments such as a standalone system. FIG. 6 illustrates an overall method 600 for retrieving data from a graphics database for the current frame. For illustrative purposes, the processing will be discussed in the context of the embodiment of the back-end nodes 208, 210 of FIG. 2. Each of the data retrieval builders 209, 211 accesses 602 the second stage substructure that has been transplanted into local memory (e.g. 306). The locator module 284A, 284B locates 604 a viewpoint substructure in the second stage progressive structure having current viewpoint data for the current frame being processed. Examples of such current viewpoint data include the viewpoint position, speed (e.g. of a vehicle the user is driving), orientation (e.g. of the aircraft a user is flying), and the current coordinate system information (e.g. UTM zone, current coordinate origin and other coordinate conversion parameters).

Using the information in this viewpoint substructure received from the builder 209, 211, the data retrieval module or unit 272, 273 determines 606 the location of data in the vicinity of the viewpoint in the database, for example which cells in stored files have data located in the vicinity and that have to be dynamically retrieved as is often required in interactive graphics systems having a strict display update rate requirement of typically 60 Hz. Data in the vicinity of the viewpoint includes data in the displayable vicinity of the viewpoint. Examples of displayable data are cells currently being displayed or which are near the edges of the cells currently being displayed to a user. An example of the data to be retrieved is the terrain elevation and cultural features data that surrounds the current viewpoint of the plane in a flight simulator for a given altitude and visual range. In this embodiment, the data retrieval unit 272, 273 determines 610 if the data in the displayable vicinity needs to be updated because the data has changed from a previous frame. If it does, the data is retrieved 612 by the data retrieval unit 272, 273. If further processing is to be done on the retrieved data 615, the data retrieval unit 272, 273 616 performs the additional processing on the retrieved data.

For example, back-end data retrieval node 208 may be networked to a display rendering node that displays data generated from sensors. The data retrieval unit 272 retrieves data in the form of a material map, and uses data such as the sensor response data, illumination data, atmospheric data contained in the progressive data structure to produce a texture map representing the material map as perceived by the sensor. For other display rendering nodes that display visual graphics data from a scene database on a display device such as a CRT, the data retrieval units may perform little or no processing on the retrieved data.

Next the data is forwarded 618 to display channel rendering builders. In the context of FIG. 2, the data retrieval unit 272, 273 formats the retrieved data into network packets and transmits the retrieved data using the network protocol to the rendering nodes 214, 216, 218, 220 over the third network 222A, 222B. In the context of a standalone configuration, the retrieved data is stored in local memory for use by the display channel rendering builders.

In the embodiment of FIG. 2, one version of the database is maintained for all nodes of the clustered system. Advantageously, the data retrieval nodes retrieve the data that is necessary for the rendering nodes as opposed to each rendering node accessing the database independently for a copy of the data it needs, which may lead to revision management problems due to the existence of a separate copy of the scene database for each node. Databases for image generation systems such as flight simulators can be in the multi-gigabyte or terabyte range in order to store all the terrain texture data for example, and thus a single shared database copy can increase performance and reduce significantly the system cost.

Figure 7:
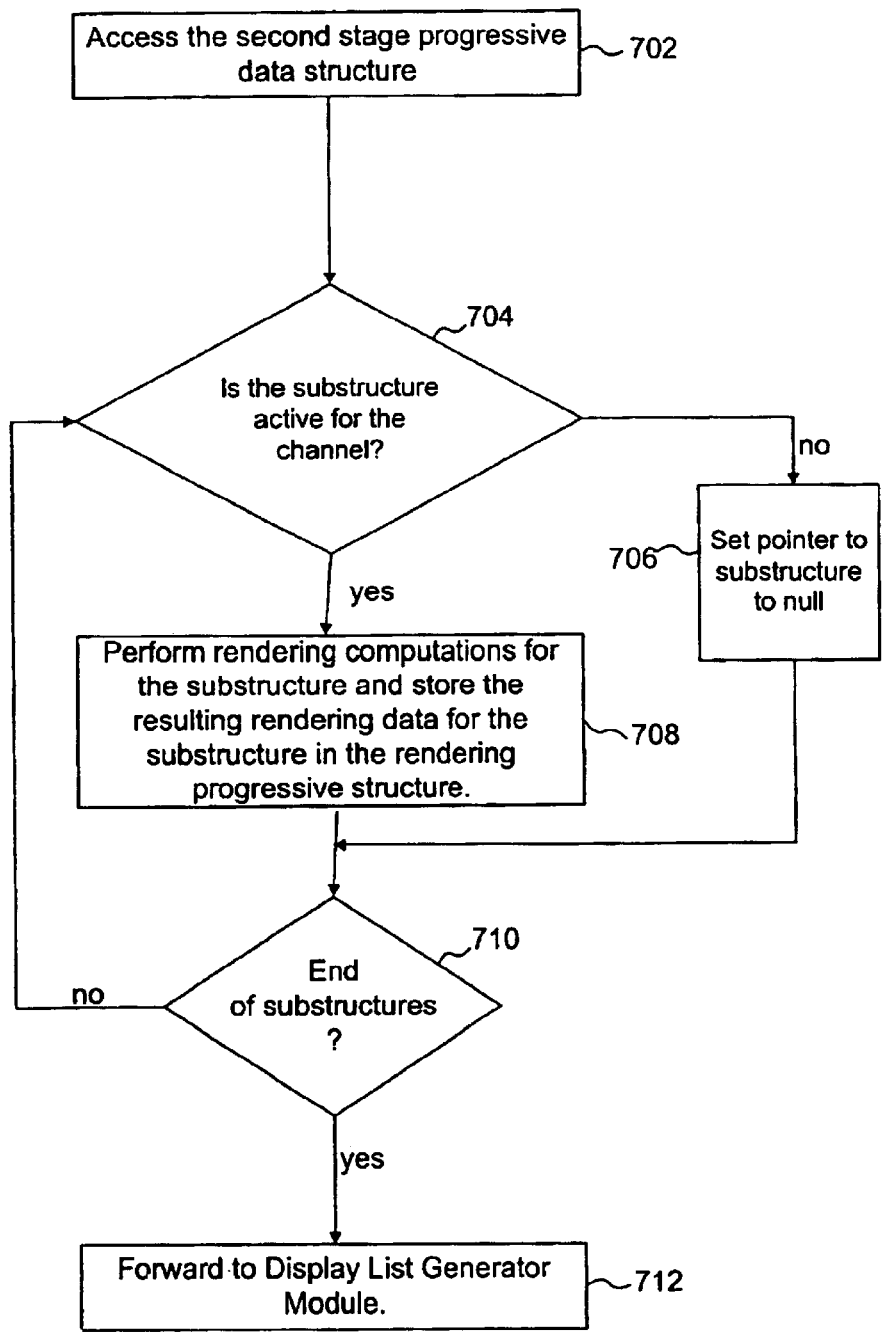
FIG. 7 illustrates an embodiment of a method for constructing a progressive data structure for the data to be rendered by a particular channel in accordance with the present invention.

Subsequent processing of the second stage progressive structure is also performed for generating a third stage progressive data structure, a display channel progressive data structure, for use in generating rendering data for a particular display channel. In the embodiment of FIG. 2, the back-end nodes 214, 216, 218, 220 are rendering nodes having builders 215, 219, 223, 227 that render the graphics for a particular channel using information in the second stage progressive data structure. Again, this processing may be performed by other embodiments such as a standalone system. FIG. 7 illustrates an overall method 700 for generating rendering data for a particular display channel using a progressive data structure. For illustrative purposes, the processing will be discussed in the context of the embodiment of the back-end nodes 214, 216, 218, 220 of FIG. 2.

Builder 215, 219, 223, 227 accesses 702 the transplanted second stage progressive data structure in local memory. In one embodiment, the builder 215, 219, 223, 227 locates (e.g. using the locator function 284D, 284E, 284F, 284G) the substructure in the second stage structure having the viewpoint for the frame. From the viewpoint information, the builder determines the view parameters for its channel such as the view frustrum. The builder determines the transformation matrix appropriate for its channel, this matrix being used to determine visibility in view frustum culling tests.

The builder 215, 219, 223, 227 begins traversing 704 the second stage data structure beginning with a base substructure. For each substructure traversed, the builder determines 704 whether the substructure is active or not. This determination is made according to the nature of the structure. If, for example, the structure represents a scene element (e.g., air target) that falls outside the current view frustum of the channel in which the builder resides, then the structure will be excluded. Some structures contained within the second stage progressive data structure may not be relevant to the particular function of the particular node type in which the builder resides, and therefore are excluded. For example, intersection requests are ignored by a rendering node. For all substructure types, however, if the substructure is not active in the second stage structure, the substructure will also be excluded from the rendering structure. In the embodiment of the structure of FIG. 1, the pointer to the substructure in the progressive data structure is then set 706 to NULL or some other special value that may be assigned. If the substructure is active, then a pointer to it is included in the header portion of the rendering progressive data structure or in the parent substructure if the substructure in question is not a top-level or base substructure. Again the rendering data structure may be implemented as a modified version of the second stage structure.

The builder 215, 219, 223, 227 expands the substructure by performing 708 rendering computations for the substructure and storing the resulting rendering data for the substructure in the display channel progressive data structure. Example of data that may be included in the resulting rendering data are an actual 4×4 transformation matrix in local rendering coordinates, in the actual format required by the graphics pipeline in accordance with the view offsets of a channel in the image generation system, a set of flags to assist in view frustum culling of other objects in the scene, and terrain and cultural feature cell indices for dynamic elevation and feature data positional transformations in accordance to the view, for example as may be determined by an aircraft location, within the extents of the scene database. Other data that may also be included is an inverse camera matrix generated for optimization or convenience purposes. Once the list of pointers in the received progressive data structure has been traversed 710, the generated render progressive data structure is forwarded 712 to the display list generator module 217, 221, 225, 229.

Figure 8:
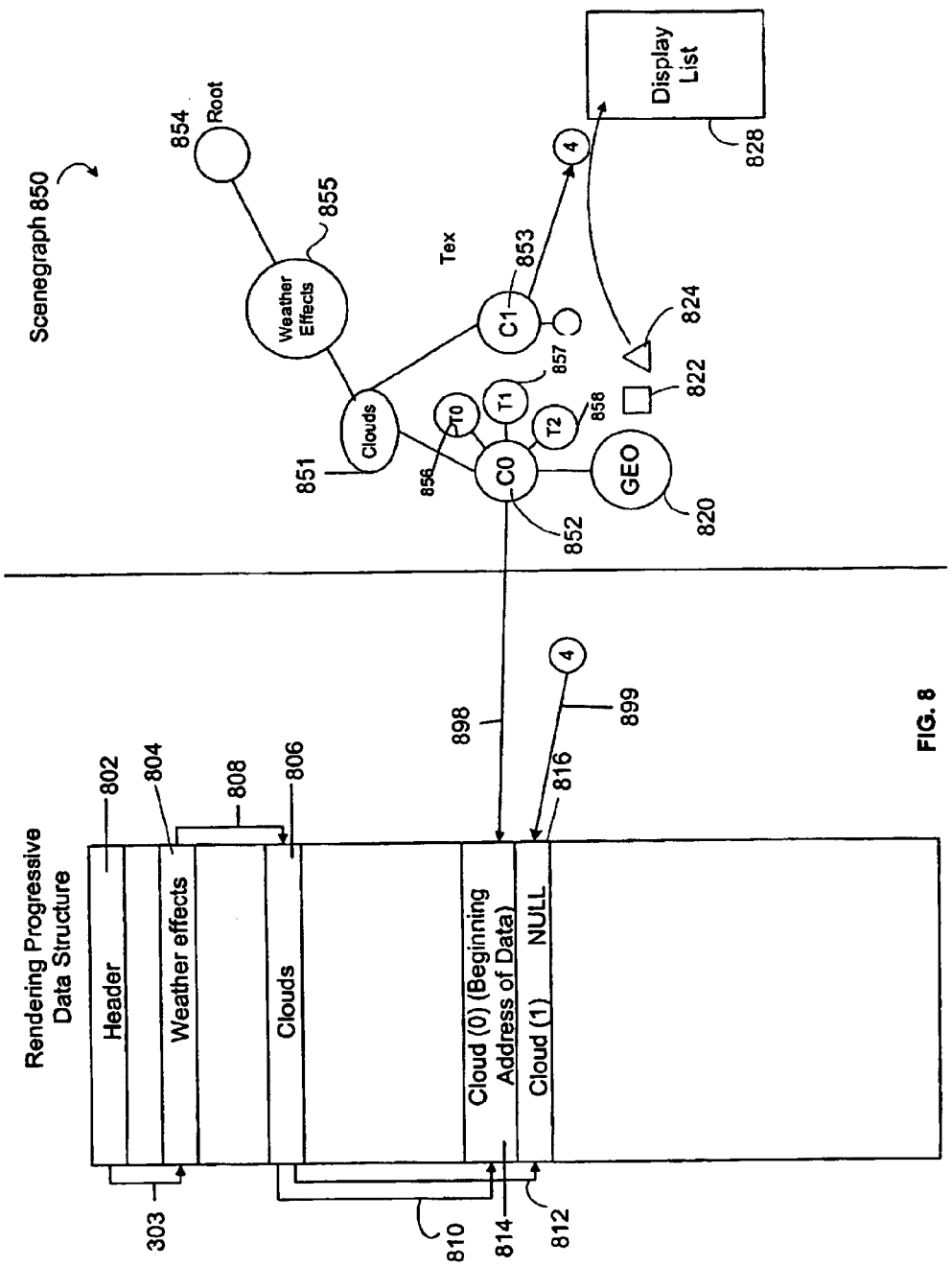
FIG. 8 illustrates an example of the traversal of a scenegraph using a progressive data structure for a particular channel for the creation of a display list in accordance with the present invention.

FIG. 8 illustrates an example of the traversal of a scene-graph using a progressive data structure for the creation of a display list in accordance with the present invention. In the embodiment of FIG. 2, the rendering nodes have locally stored the geometry for all objects in the current frame in geometry nodes attached to a scenegraph. The data in the rendering progressive data structure updates some attributes such as the object positions or the color of the light. In the case of dynamic geometry such as the paged terrain or cultural features, the data updates are stored in this progressive structure and copied to a display list during traversal of the scenegraph by the display list generator modules 217, 221, 225, 229. The render progressive data structure is used by each node in its specific computations or rendering traversals. During the traversal, nodes in the scenegraph refer to data in the render progressive structure for information such as geometry, texture maps, colors, transformation matrices and subgraph pruning information. The result of the traversal is a display list of graphics commands that is executed to render the scene for each frame.

In FIG. 8, the rendering progressive data structure comprises a header portion 802 and a weather structure 804 to which it has a pointer 803. The weather structure 804 includes a pointer 808 to a nested sub-structure for clouds 806 that has pointers 810, 812 to two nested structures cloud(0) 814 and cloud(1) 816. The pointer 816 for cloud(1) points to NULL so that only cloud(0) will be included in the generated display list 828 for this example. The scenegraph 850 illustrated in FIG. 8 is traversed, referring to the render progressive data structure in the generation of a display list. Scenegraph 850 comprises a root node 854, of which weather effects group 855 is a child. Among the children of weather group 855 is clouds group 851. Clouds group 851 has 2 children: cloud(0) 852 and cloud(1) 853, both of which contain links to texture maps and other rendering state, as well as geometry nodes. Each cloud node 852, 853 contains a locator, which is used to find the corresponding cloud structures in the render progressive data structure. Locators 898, 899 access the progressive structure, starting with the header in search of the required substructure. Locator 898 accesses pointers 803, 808, and returns the value of pointer 810. Because 810 points to a valid cloud substructure 814, the cloud data (for example, texture selectors 856, texture coordinates 857, cloud vertex positions 858) is used to update the cloud node(0) 852 and the cloud(0) geometry 820 is traversed and the commands 822 and data 824 necessary to render cloud(0) are placed in display list 828. However, locator 899 accesses pointers 803, 808 and returns the value of pointer 812, which is NULL. Because the NULL pointer is returned, the traversal skips cloud(1) 853 and no data from cloud(1) is placed in display list 828.

The progressive builders may also store internal state information in memory (e.g. cache 302, 332 or main memory 306), so that events can be triggered once by a request and then be processed automatically by the image generator. For example, if an explosion or smoke column effect is needed at a given location and time in a flight simulation, the host need only send a request once with the position, type and duration. After this initial trigger event, the different builders store an indicator of the existence of this event for its determined duration, and add the appropriate data to the subsequent progressive data structures so that the event can be properly rendered. Additionally, the builder functions can store values from previous progressive stages in local memory, creating a data cache to enhance performance and reduce database access time (e.g. disk access time). For example, in a flight simulator, different progressive pipeline stages can retain information about past ownship locations in the database to implement a cached storage for terrain texture or elevation data.

Figure 9:
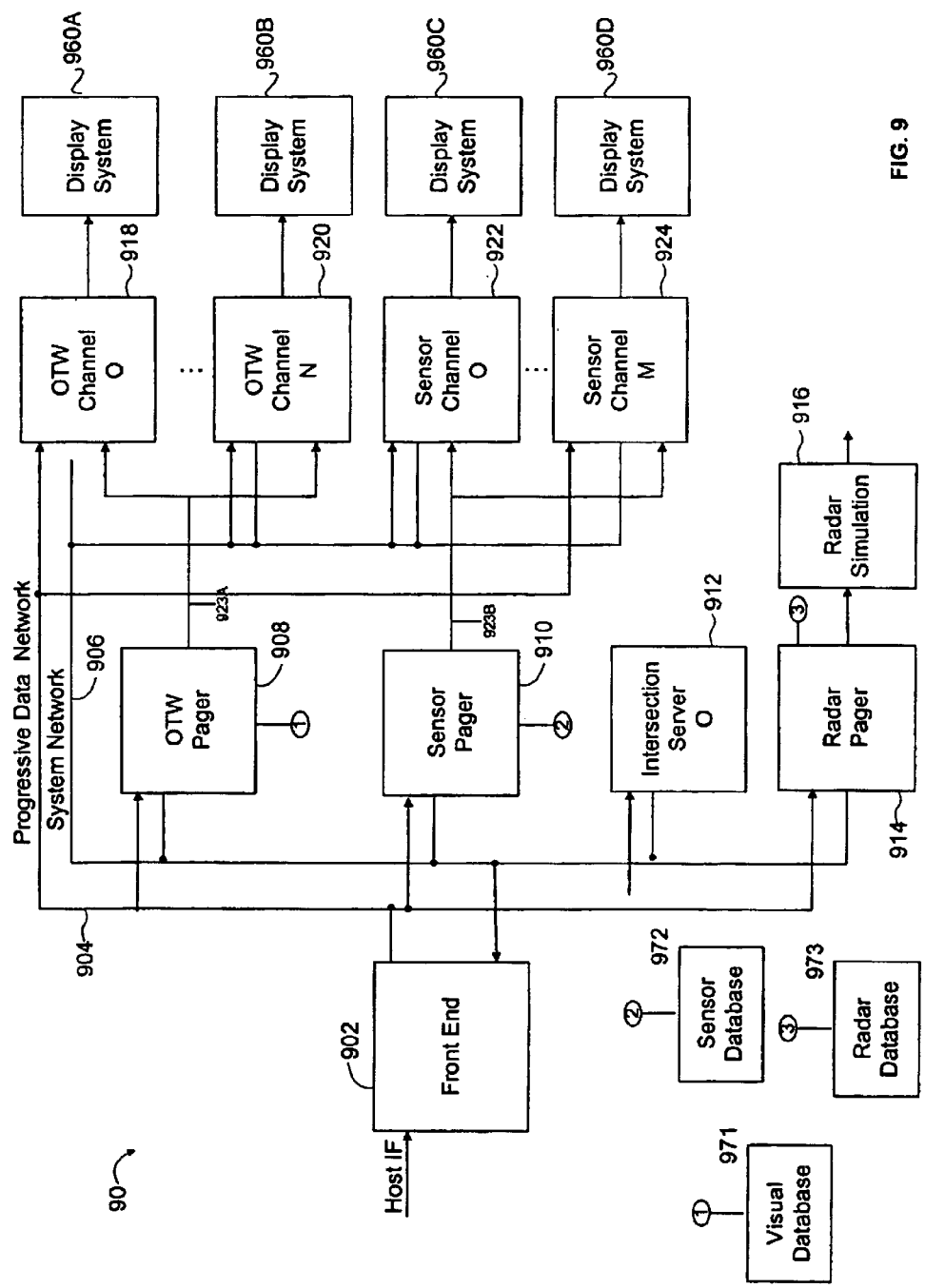
FIG. 9 illustrates an embodiment of a clustered system architecture for a flight simulator in accordance with the present invention.

FIG. 9 illustrates another embodiment of a clustered system architecture for an image generation system in a flight simulation system in accordance with the present invention. The host and image generator systems communicate through incoming data transmitted in a data structure such as that specified by an interface control document (ICD), which is a data structure that contains sub-structures for each different function in the system. In the flight simulator example, functions include weather effects, moving targets or special effects.

An image generation system in a flight simulator usually performs tasks including rendering of "out-the-window" (OTW) visual scenes for each of the channels in the display system, rendering the required sensor channels such as radar, Forward-Looking Infra-Red or Night Vision Goggles, and processing for mission functions such as height above terrain or intersection queries.

As in FIG. 2, FIG. 9 illustrates an embodiment in which a clustered system architecture 90 comprises a front-end node 902 and several back-end nodes 908, 910, 912, 914, 916, 918, 920, 922, 924 that are linked via two networks: a progressive data network 904 and a system network 906. Similarly, the front-end node 902 acts as a communications hub for the image generation system. Additionally, the front-end node 902 includes an interface for communication with the host simulation system. Additional functions that the front-end 902 may perform include user interfacing, configuration, fault-tolerance management, statistics gathering and display control.

The back-end nodes 908, 910, 912, 914, 916, 918, 920, 922, 924 comprise rendering nodes 918, 920, 922, 924, an intersection server node 912, pager nodes 908, 910, 914 and a radar simulation node 916. In the illustrated embodiment, the rendering nodes are in charge of rendering the graphics for a particular channel, either an OTW display channel, or a particular sensor channel. In the illustrated example, the rendering nodes include up to N OTW display channel nodes 918, 920 that are connected to an OTW pager node 908, and up to M sensor channel nodes 922, 924 that connect to one or more, sensor Pager nodes 910 depending on the nature of the sensor channels used. Examples of sensor channels include channels for Forward-Looking Infra-Red, Night Vision Goggles or Low Light Level Television.

The method used for rendering the terrain depends on how the data is organized in the database. Most geospecific flight simulators organize the terrain geometry into "cells." For large-area geospecific databases, the size of the terrain texture can vastly exceed the amount of texture memory available in the graphics subsystem of a rendering node, requiring many gigabytes or terabytes. For this reason, a "paging" system is commonly employed. The paging system uses a pool of texture memory for the area of regard, and updates the edges of the texture memory as the pilot flies across the database.

Another back-end node is the intersection server node 912 for processing intersection requests sent by the front end node 902. Examples of the processing that the intersection node may perform include computing mission functions, such as collisions, height above terrain, inter visibility and terrain following in accordance to the requests. Another back-end node illustrated is the pager node 908, 910. A pager node is an example of a data retrieval node. Pager node 908 retrieves data, for example terrain texture data, for a given instance of the visual database 971 for the OTW display for the current frame. Pager node 910 retrieves data from the sensor database 972 for a given type of sensor in accordance with the viewpoint defined by the host computer. The pager node 908, 910 sends the data via an additional network connection 923A, 923B to one or more rendering nodes that requires it.

In the illustrated example, the back-end nodes include a radar pager node 914 and a radar simulation node 916. The radar pager node 914 also receives data from the front-end for rendering of a radar channel for display on the system. The radar system can incorporate a separate radar pager node as is shown in FIG. 9, or be integrated as a single node. The radar pager node 914 retrieves data from a radar database 973.

FIG. 10 illustrates an example of a data pipeline system for processing different versions or stages of a progressive data structure in an image generation system of a flight simulator of FIG. 9 in accordance with the present invention. Overlaid on the data pipeline are indicators showing an example of the distribution of processing among programmable processors, CPU0 and CPU1, in the different nodes. An example of the transformation of data representing aircraft position through the pipeline is discussed The pipeline starts in the front-end node as indicated 1014, with the receipt of an ICD structure 1016 that is received from the simulation host system through a data interface (e.g. Host IF). An ICD progressive builder 1017 generates a first stage progressive data structure that will also be referred to as an ICD progressive data structure 1018 comprising an expression or representation of the same ICD data for a given frame in the format of a progressive data structure described above with a header and pointers to substructures that is fully populated at this stage. In the example of the processing of the aircraft position, the aircraft position data starts in the front end node of the system at this first progressive stage, as latitude and longitude coordinates, height in feet and heading, pitch and roll angles as they are received from the simulation host system and are stored in the ICD progressive structure as such.

A network progressive builder 1022 receives the ICD progressive data structure 1018 and creates a network progressive data structure 1024 by removing all the data that is not needed for the current frame. Examples of unneeded data are data for special effects that are not active or moving targets too far away to be visible. The network progressive builder 1022 also expands some of the present data into a more concrete description for the required graphic operations. In the aircraft position example, the coordinates are converted to the proper UTM (Universal Transverse Mercator) coordinate space for the database being rendered, and terrain and cultural feature region indices for dynamic database retrieving are computed in this second progressive stage and stored in the network (second stage) progressive data structure.

The network progressive data structure is shared by all the back-end nodes. In the context of FIG. 9, if the front-end has two programmable processors CPUs (e.g. CPU 303 and 333), CPU0 may execute the instructions for the ICD progressive builder for one frame while CPU1 is executing the instructions for the network progressive builder processing the ICD progressive data structure of the previous frame as input.

Upon exiting the front-end node, the network progressive data structure is transmitted over the progressive data network 904 using a communication protocol such as multicast UDP to the back-end nodes including a rendering node 918 for a display channel. In this network example, a transplant module 1026 receives the network progressive data structure and generates a local copy of the network progressive data structure with valid pointers to local memory.

Once the network progressive data structure is transplanted for each back end node, a rendering progressive builder 1028 particularizes the information of the network progressive data structure for its channel's requirements in the generation of a rendering progressive data structure 1030. The render progressive data structure is a much more extensive data structure that is used to update one or more display lists to be rendered. As shown in FIG. 10, the render progressive builder 1028 expands the data in the network structure to be stored in the rendering structure by integrating the addresses of terrain texture data received from the pager node 908 into the rendering data structure, performing rendering computations on the substructures, and storing the resulting rendering data in the third stage rendering data structure. In the third or render progressive stage, the aircraft position data and other viewpoint data of the example is converted into a 4×4 transformation matrix as required by the graphics hardware, and additional progressive substructures are created for the terrain and cultural feature rendering and retrieval in accordance to the indices computed in the previous progressive stage.

If the rendering node 918 has two CPUs, the transplant module and the render progressive builder module processing may be executed on CPU0 while CPU1 is executing instructions for the display list generator 1032 to generate a display list 1034 based on the rendering progressive data structure 1030.

Various embodiments of the present invention have been described above. Many aspects of the invention are independent of scene complexity and bandwidth, and are capable of being implemented on a variety of computer systems. It should be understood that these embodiments have been presented by way of example only, and not limitation. It will be understood by those skilled in the relevant art that various changes in form and the details of the embodiments described above may be made without departing from the spirit and scope of the present invention.

What is claimed is:

1. An image generation system including a plurality of networked nodes, the system comprising:
   a plurality of renderer nodes for receiving scene and viewpoint data and rendering scenes containing the received scene data, each renderer node coupled to at least one display device for displaying a rendered scene;
   a data retrieval node, for receiving the viewpoint data, storing a scene database and transmitting elements of the scene database to the renderer nodes;
   wherein the elements transmitted by the data retrieval node are selected according to the viewpoint data received by the data retrieval node; and
   the renderer nodes render, cache and discard the received elements using the viewpoint data.

2. The image generation system of claim 1 wherein the viewpoint data is received from a simulation host computer.

3. The image generation system of claim 1 wherein the viewpoint data is received from a front end node.

4. The image generation system of claim 1 wherein the transmission of elements by the data retrieval node is a multicast transmission.

5. The image generation system of claim 1 wherein the transmission of elements by the data retrieval node is a broadcast transmission.

6. The image generation system of claim 1 wherein the transmitted elements include terrain imagery.

7. The image generation system of claim 1 wherein the transmitted elements include terrain elevation data.

8. The image generation system of claim 7 wherein the terrain elevation data is a mesh.

9. The image generation system of claim 1 wherein the transmitted elements include cultural features.

10. A method for rendering a scene in real time, the scene including elements stored in a data retrieval node, the method comprising:

receiving viewpoint data at the data retrieval node and at rendering nodes;

selecting, by the data retrieval node, elements of a scene associated with the viewpoint data;

transmitting the selected elements from the data retrieval node to the rendering nodes;

caching, by the rendering nodes, the transmitted elements using the viewpoint data;

rendering the scene by the rendering nodes; and displaying the scene on a display device coupled to at least one rendering node.

11. A computer program product for rendering a scene in real time, the computer program product stored on a computer readable medium and including instructions for causing a computer to perform the steps of:

receiving viewpoint data at the data retrieval node and at rendering nodes;

selecting, by the data retrieval node, elements of a scene associated with the viewpoint data;

transmitting the selected elements from the data retrieval node to a the rendering nodes;

caching, by the rendering nodes, the transmitted elements using the viewpoint data;

rendering the scene by the rendering nodes; and displaying the scene on a display device coupled to at least one rendering node.

* * * * *

UNITED STATES PATENT AND TRADEMARK OFFICE
CERTIFICATE OF CORRECTION

PATENT NO. : 6,940,513 B2  Page 1 of 1
DATED : September 6, 2005
INVENTOR(S) : David L. Morgan III et al.

It is certified that error appears in the above-identified patent and that said Letters Patent is hereby corrected as shown below:

Column 18,
Line 13, after "to" delete "a".

Signed and Sealed this

Fifteenth Day of November, 2005

JON W. DUDAS
*Director of the United States Patent and Trademark Office*